(12) United States Patent
Fujimoto

(10) Patent No.: US 11,574,212 B2
(45) Date of Patent: Feb. 7, 2023

(54) INTERACTION DEVICE AND INTERACTIVE RESPONSE SYSTEM

(71) Applicant: NTT DOCOMO, INC., Chiyoda-ku (JP)

(72) Inventor: Hiroshi Fujimoto, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 315 days.

(21) Appl. No.: 16/753,385

(22) PCT Filed: Nov. 13, 2018

(86) PCT No.: PCT/JP2018/041979
§ 371 (c)(1),
(2) Date: Apr. 3, 2020

(87) PCT Pub. No.: WO2019/102904
PCT Pub. Date: May 31, 2019

(65) Prior Publication Data
US 2020/0285974 A1 Sep. 10, 2020

(30) Foreign Application Priority Data
Nov. 22, 2017 (JP) .............................. JP2017-224764

(51) Int. Cl.
*G06N 5/04* (2006.01)
(52) U.S. Cl.
CPC ....................... *G06N 5/04* (2013.01)
(58) Field of Classification Search
None
See application file for complete search history.

(56) References Cited

U.S. PATENT DOCUMENTS

2005/0125370 A1* 6/2005 Brennan ............... G06N 5/02
707/E17.14
2011/0106895 A1* 5/2011 Ventilla ................ G06Q 10/10
709/204
(Continued)

FOREIGN PATENT DOCUMENTS

JP 11-265400 A 9/1999
JP 2002-328932 A 11/2002
(Continued)

OTHER PUBLICATIONS

International Preliminary Report on Patentability and Written Opinion dated Jun. 4, 2020 in PCT/JP2018/041979 (submitting English translation only), 16 pages.
(Continued)

*Primary Examiner* — Brian Whipple
(74) *Attorney, Agent, or Firm* — Oblon, McClelland, Maier & Neustadt, L.L.P.

(57) ABSTRACT

An interaction bot system is an interaction answer system that interacts with a user and provides an answer to a question from the user. The interaction bot system includes a first bot device and at least two or more second bot devices. The first bot device includes a first generation unit configured to generate first narrowing down information for specifying the second bot device corresponding to the question from the user on the basis of the question from the user, and a specification unit configured to specify the second bot device on the basis of the first narrowing down information. The second bot device includes a second generation unit configured to generate second narrowing down information for specifying the answer to the question on the basis of the question from the user, and an answer generation unit configured to generate and output the answer to the question
(Continued)

from the user on the basis of the second narrowing down information.

4 Claims, 8 Drawing Sheets

(56) References Cited

U.S. PATENT DOCUMENTS

2013/0171605 A1* 7/2013 Tang ................. G09B 5/00
434/352
2018/0181558 A1* 6/2018 Emery ................ H04L 51/02

FOREIGN PATENT DOCUMENTS

JP  2003-228575 A  8/2003
JP  2009-187163 A  8/2009

OTHER PUBLICATIONS

Office Action dated May 11, 2021 in corresponding Japanese Patent Application No. 2019-555270 (with English Translation), 14 pages.
International Search Report dated Dec. 18, 2018 in PCT/JP2018/041979 filed Nov. 13, 2018, 1 page.
Decision of Refusal dated Oct. 19, 2021 in Japanese Patent Application No. 2019-555270 (with English language translation), 14 pages.

* cited by examiner

Fig.3

| SECOND BOT DEVICE LIST | Android | iPhone | MAIL | CAMERA | WIRELESS LAN |
|---|---|---|---|---|---|
| FAQ BOT DEVICE 20A | o | | o | | |
| FAQ BOT DEVICE 20B | | o | o | | |
| FAQ BOT DEVICE 20C | | | o | | o |
| ... | ... | ... | ... | ... | ... |

| ANSWER LIST | Android | MAIL | PASSWORD | IMAGE | PHONEBOOK |
|---|---|---|---|---|---|
| WHEN YOU FORGOT PASSWORD OF MAIL... | ○ | ○ | ○ | | |
| TO ATTACH IMAGE TO MAIL... | ○ | ○ | | ○ | |
| TO CREATE MAIL FROM PHONEBOOK... | ○ | ○ | | | ○ |
| ... | ... | ... | ... | ... | ... |

TB2

INTERACTION DEVICE AND INTERACTIVE RESPONSE SYSTEM

TECHNICAL FIELD

One aspect of the present invention relates to an interaction device and an interaction answer system related to provision of an answer to a question from a user.

BACKGROUND ART

In the related art, a system that performs a process of answering a question by matching in a system of frequently asked questions (FAQ) or the like is known. For example, Patent Literature 1 below discloses a technique for providing an answer to a question by matching a question (search input sentence acquired from a user with an example sentence prepared in advance.

CITATION LIST

Patent Literature

[Patent Literature 1] Japanese Unexamined Patent Publication No. 2003-228575

SUMMARY OF INVENTION

Technical Problem

Here, since the questions from the user are various, in order to appropriately answer various questions from the user in the system as described above, it is necessary to prepare a large amount of data for matching with the questions and perform complicated calculation. Therefore, the calculation cost of the system is high and a processing load on the system is high.

One aspect of the present invention is made in view of the circumstances described above, and an object of the aspect of the present invention is to reduce the processing load on the system.

Solution to Problem

An interaction device according to one aspect of the present invention is an interaction device related to provision of an answer to a question from a user. The interaction device includes a first generation unit configured to generate first narrowing down information for specifying an answer unit that answers the question from the user on the basis of the question from the user, and a specification unit configured to specify the answer unit on the basis of the first narrowing down information.

In the interaction device according to one aspect of the present invention, the answer unit that answers the question from the user is specified according to the first narrowing down information based on the question from the user. That is, an interaction answer system including the present interaction device has a multi-stage configuration in which a configuration (the interaction device) that specifies a configuration for answering the question from the user (distributes the questions) and a configuration (the answer unit) that answers the question from the user are provided separately. Since the questions from the user are various, in a case in which answers to all the questions are generated in one configuration, it is necessary to prepare a large amount of data for matching the questions and perform complicated calculations. Therefore, there is a problem that the calculation cost of the system increases and the processing load on the system increases. In this respect, it is possible to distribute the processing load and reduce concentration of processes on a specific device, by separately providing the configuration that distributes the questions to an appropriate answer subject according to the question from the user from the configuration that generates the answer, such as in the interaction device according to one aspect of the present invention. That is, it is possible to reduce the processing load on the entire system by using the interaction device according to one aspect of the present invention. In addition, by adopting the multi-stage configuration, at the time of maintenance of the system, it is possible to perform maintenance on only a specific device while avoiding an influence on a device that is not a target of the maintenance and it is possible to reduce maintenance cost.

In the interaction device described above, the first generation unit may generate the first narrowing down information on the basis of a word obtained from the question from the user. Therefore, it is possible to set narrowing down information as a list of words and it is possible to easily perform the specification of the answer unit by the specification unit in a word unit.

In the interaction device described above, the first generation unit may update the first narrowing down information on the basis of first update information for updating the generated first narrowing down information. As described above, by appropriately updating the generated narrowing down information on the basis of predetermined information, it is possible to improve the specification accuracy of the answer unit. That is, for example, even in a case in which the answer unit is not able to be specified by the first narrowing down information generated initially, it is possible to appropriately specify the answer unit by the updated first narrowing down information.

The interaction device described above may further include a first user answer acquisition unit configured to output information related to the first narrowing down information and obtain a first user answer that is an answer of the user for the information related to the first narrowing down information. The first generation unit may update the first narrowing down information using the first user answer as the first update information. Therefore, it is possible to update the first narrowing down information from the answer from the user in relation to the narrowing down information, and it is possible to generate an answer more reflecting an intention of the user.

An interaction answer system according to one aspect of the present invention is an interaction answer system that interacts with a user and provides an answer to a question from the user. The interaction answer system includes a first interaction unit and at least two or more second interaction units. The first interaction unit includes a first generation unit configured to generate first narrowing down information for specifying the second interaction unit on the basis of the question from the user, and a specification unit configured to specify the second answer unit corresponding to the question from the user on the basis of the first narrowing down information. The second interaction unit includes a second generation unit configured to generate second narrowing down information for specifying the answer to the question on the basis of the question from the user, and an answer generation unit configured to generate and output the answer to the question from the user on the basis of the second narrowing down information.

In the interaction answer system according to one aspect of the present invention, the first interaction unit specifies the second interaction unit corresponding to the question from the user in accordance with the first narrowing down information based on the question from the user, and the second interaction unit generates and outputs the answer to the question from the user according to the second narrowing down information based on the question from the user. That is, the present interaction answer system has a multi-stage configuration in which a configuration (the first interaction unit) that specifies a configuration for answering the question from the user (distributes the questions) and a configuration (the second interaction unit) that answers the question from the user are provided separately. Since the questions from the user are various, in a case in which answers to all the questions are generated in one configuration, it is necessary to prepare a large amount of data for matching the questions and perform complicated calculations. Therefore, there is a problem that the calculation cost of the system increases and the processing load on the system increases. In this respect, it is possible to distribute the processing load and reduce concentration of processes on a specific device, by separately providing the configuration that distributes the questions to an appropriate answer subject according to the question from the user from the configuration that generates the answer, such as the interaction answer system according to one aspect of the present invention. That is, it is possible to reduce the processing load in the interaction answer system according to one aspect of the present invention. In addition, by adopting the multi-stage configuration, at the time of maintenance of the system, it is possible to perform maintenance on only a specific device while avoiding the influence on a device that is not a target of the maintenance and it is possible to reduce maintenance cost. In addition, since the second interaction unit is able to perform an answer process without being affected by the other second interaction units, in a case in which access is concentrated on a specific second interaction unit, it is sufficient to perform load countermeasures such as improving a function of only the device. That is, the load countermeasure is facilitated.

In the interaction answer system described above, the specification unit may share the first narrowing down information generated by the first generation unit with the specified second interaction unit, and the second generation unit may generate the second narrowing down information on the basis of the first narrowing down information shared by the specification unit. Therefore, it is possible to generate the second narrowing down information easily and accurately in the second interaction unit by using the first narrowing down information generated in the first interaction unit.

In the interaction answer system described above, in a case in which the answer generation unit is not able to generate the answer to the question from the user, the answer generation unit may output answer impossibility information indicating that the answer is not able to be generated, and the specification unit may specify the second interaction unit other than the second interaction unit which has output the answer impossibility information, on the basis of the answer impossibility information. Therefore, in a case in which the initially specified second interaction unit is not able to answer the question from the user, it is possible to specify the other second interaction unit (the second interaction unit that is able to answer) other than the second interaction unit which could not answer. That is, it is possible to easily specify an appropriate second interaction unit.

In the interaction answer system described above, the answer generation unit may output the second narrowing down information used when generating the answer to the question from the user, in addition to the answer impossibility information, and the specification unit may specify the second interaction unit other than the second interaction unit that has output the answer impossibility information on the basis of the answer impossibility information and the second narrowing down information output from the answer generation unit. Therefore, it is possible to use the second narrowing down information generated by the initially specified second interaction unit (the second interaction unit which could not answer the question) as information for specifying a new second interaction unit, and it is easy to specify a more appropriate second interaction unit.

Advantageous Effects of Invention

According to one aspect of the present invention, it is possible to reduce the processing load on the system.

BRIEF DESCRIPTION OF DRAWINGS

FIG. 3 is a table showing a truth table TB1 held by a first bot device.

FIG. 4 is a table showing a truth table TB2 held by a second bot device.

DESCRIPTION OF EMBODIMENTS

Hereinafter, embodiments of the present invention will be described in detail with reference to the attached drawings. In the description of the drawings, the same or equivalent elements will be denoted by the same reference symbols, and duplicated description will be omitted.

Figure 1:
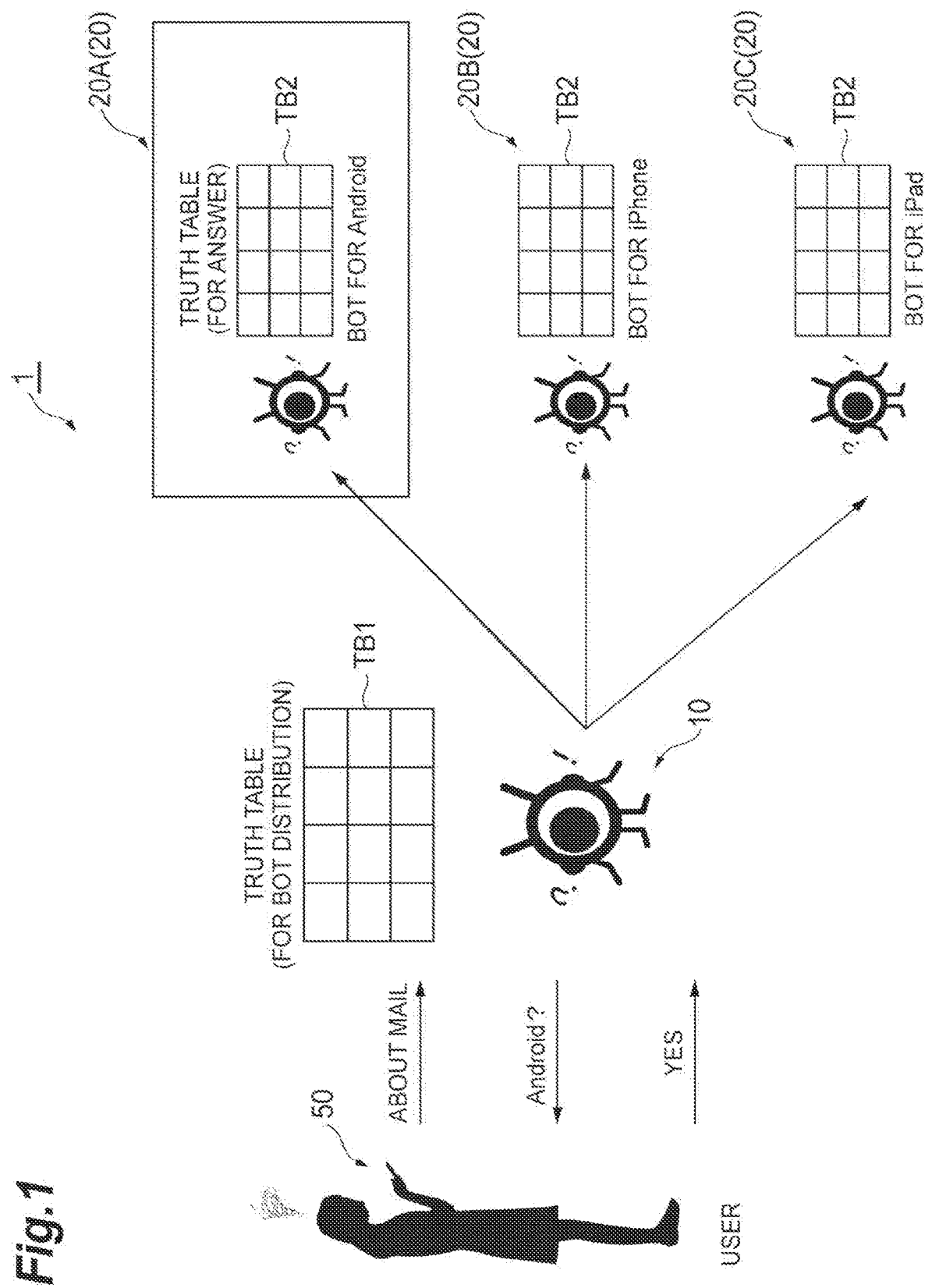
FIG. 1 is a diagram for explaining an outline of an interaction bot system according to the present embodiment.

FIG. 1 is a diagram for explaining an outline of an interaction bot system according to the present embodiment. The interaction bot system 1 shown in FIG. 1 is an interaction answer system that interacts with a user and provides an answer to a question from the user. In the present embodiment, the bot is an application and a program for automating a predetermined process. The interaction bot system 1 is, for example, a system that prepares in advance answers to frequently asked questions (FAQ: Frequently Asked Questions) from the user and provides answers corresponding to the questions in a case where the user asks.

As shown in FIG. 1, the interaction bot system 1 includes a first bot device 10 (interaction device, first interaction unit) and at least two or more second bot devices 20 (answer unit, second interaction unit). The first bot device 10 is a server device that distributes a question from the user to an appropriate second bot device 20 and manages an answer state. That is, the first bot device 10 receives a question from a user terminal 50 transmitting the question of the user, and distributes the question to the second bot device 20 appropriate as an answer subject of the question according to content of the question. The first bot device 10 specifies the second bot device 20 of a destination to which the question is distributed, on the basis of a distribution truth table TB1 (refer to FIG. 3) in which the question content and the distribution destination (the second bot devices 20) are associated with each other. Details of a function of the first bot device 10 will be described later.

The second bot device 20 is a server device that answers the question from the user. That is, the second bot device 20 receives the question from the user terminal 50 and provides the answer corresponding to the question to the user terminal 50. A plurality of second bot devices 20 are provided according to the question contents. For example, the second bot devices 20 are an FAQ bot device 20A including an Android bot capable of providing an answer to a question related to an Android terminal, an FAQ bot device 20B including an iPhone bot capable of providing an answer to a question related to an iPhone, an FAQ bot device 20C including an iPad bot capable of providing an answer to a question related to an iPad, and the like. The second bot device 20 generates the answer to the question on the basis of an answer truth table TB2 (refer to FIG. 4) in which the question content and the answer are associated (details will be described later). Details of a function of the second bet device 20 will be described later.

The user terminal 50 is a communication terminal operated by the user, and is, for example, a smartphone or a tablet type terminal.

The user terminal 50 is configured by including an input unit that receives an input of the question from the user, a communication unit that transmits and receives the question and the answer, and a display that displays the answer or the like from the interaction bot system 1 (more specifically, the second bot device 20).

Figure 2:
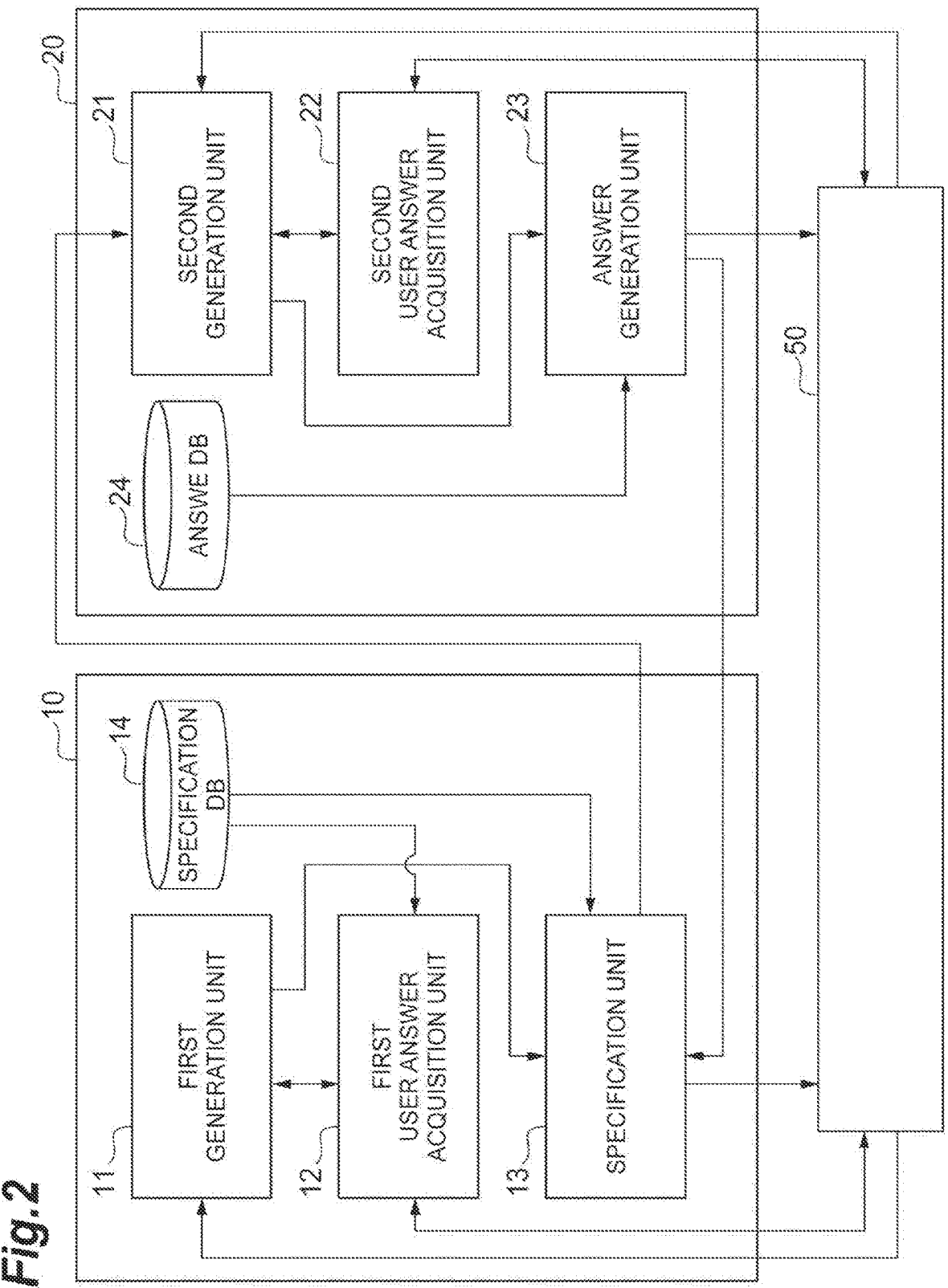
FIG. 2 is a block diagram showing a functional configuration of the interaction bot system.

Next, a functional configuration of the interaction bot system 1 will be described with reference to FIG. 2. FIG. 2 is a block diagram showing the functional configuration of the interaction bot system 1. As described above, the interaction bot system 1 includes the first bot device 10 and the second bot device 20. As shown in FIG. 2, the first bot device 10 includes a first generation unit 11, a first user answer acquisition unit 12, a specification unit 13, and a specification DB 14.

The specification DB 14 is a database that holds the truth table TB1 (refer to FIG. 3) for question distribution by the first but device 10. As shown in FIG. 3, in the truth table TB1, a predetermined word (question content) is associated with each second bot device 20 (distribution destination). For example, words "Android" and "mail" are associated with the FAQ bot device 20A. This indicates that the FAQ bot device 20A answers a question related to a mail of Android.

The first generation unit 11 generates first narrowing down information for specifying (for narrowing down) one second bot device 20 on the basis of the question from the user. The first generation unit 11 generates the first narrowing down information on the basis of a word obtained from the question from the user. The first generation unit 11 performs a process such as morphological analysis on a question sentence from the user to extract the word. For example, the first generation unit 11 extracts "mail" and "is not sent" by morphological analysis or the like for the question sentence "mail is not able to be sent" and sets these words as the first narrowing down information. In addition, the first generation unit 11 updates the first narrowing down information on the basis of first update information for updating the generated first narrowing down information. The first generation unit 11 updates the first narrowing down information using a first user answer acquired from the user by the first user answer acquisition unit 12 as the first update information described above.

The first user answer acquisition unit 12 generates an update question (information related to the first narrowing down information) on the basis of the first narrowing down information generated by the first generation unit 11, and transmits (outputs) the update question to the user terminal 50. The first user answer acquisition unit 12 generates the update question on the basis of the first narrowing down information and the truth table TB1 (refer to FIG. 3) stored in the specification DB 14. For example, it is assumed that the first narrowing down information is "mail", and as shown in FIG. 3, in the truth table TB1, there are three second bot devices 20 (the FAQ bot device 20A, the FAQ bot device 20B, and the FAQ bot device 20C) associated with the word "mail". In the truth table TB1, "mail" and "Android" are associated with the FAQ bot device 20A, "mail" and "iPhone" are associated with the FAQ bot device 20B, and "mail" and "wireless LAN" are associated with the FAQ bot device 20C. In this case, the first user answer acquisition unit 12 generates the update question so that one second bot device 20 is able to be specified by the updated first narrowing down information. That is, the first user answer acquisition unit 12 generates the update question (for example, "Are you using Android?") for clarifying whether the question is a question of a mail related to Android, a question of a mail related to iPhone, or a question of a mail related to wireless LAN.

The first user answer acquisition unit 12 receives, from the user terminal 50, a first user answer that is the answer of the user to the above-described update question. The first generation unit 11 described above updates the first narrowing down information on the basis of the first user answer. That is, for example, in a case in which the first narrowing down information before the update is "mail", when the answer to the update question "Are you using Android?" is "Yes", the first generation unit 11 updates the first narrowing down information to "mail, Android".

The specification unit 13 specifies the second bot device 20 corresponding to the question from the user on the basis of the first narrowing down information. The specification unit 13 specifies one second bot device 20 corresponding to the first narrowing down information by referring to the truth table TB1 (refer to FIG. 3) of the specification DB 14. In the example shown in FIG. 3, for example, in a case in which it is assumed that the first narrowing down information is "mail, Android", the specification unit 13 refers to the truth table TB1 and specifies the FAQ bot device 20A with which "mail" and "Android" are associated as the second bot device 20 corresponding to the question from the user.

In a case in which the specification unit 13 specifies the second bot device 20, the specification unit 13 transmits, to the user terminal 50, answer bot information that is information for informing the user of the specified second bot device 20. The answer bot information includes, for example, a message to be displayed on the user terminal 50, such as "Connect to the FAQ bot device 20A". In addition, the specification unit 13 transmits the first narrowing down information (the first narrowing down information generated and updated by the first generation unit 11) used for specifying the second bot device 20 to the specified second bot device 20. That is, the specification unit 13 causes the second bot device 20 to inherit a key list.

As shown in FIG. 2, the second bot device 20 includes a second generation unit 21, a second user answer acquisition unit 22, an answer generation unit 23, and an answer DB 24. The answer DB 24 is a database that holds the truth table TB2 (refer to FIG. 4) for the answer (the answer to the question of the user) by the second bot device 20. As shown in FIG. 4, in the truth table TB2, a predetermined word (question content) is associated with each answer. For example, words "Android", "mail", and "password" are associated with the answer "When you forgot password of mail . . . ". This indicates that the answer of "When you forgot password of mail . . . " corresponds to the question including "Android," "mail," and "password".

The second generation unit 21 generates second narrowing down information for specifying the answer to the question on the basis of the question from the user. The second generation unit 21 generates the second narrowing down information on the basis of the word obtained from the question from the user. The second generation unit 21 may generate the second narrowing down information on the basis of the first narrowing down information shared by the specification unit 13 of the first bot device 10. In this case, the second generation unit 21 may use the first narrowing down information as it is shared by the specification unit 13 as the second narrowing down information. In addition, the second generation unit 21 may newly generate second narrowing down information regardless of the first narrowing down information. In addition, the second generation unit 21 updates the second narrowing down information on the basis of second update information for updating the generated second narrowing down information. The second generation unit 21 updates the second narrowing down information using the second user answer acquired from the user by the second user answer acquisition unit 22 as the second update information described above.

The second user answer acquisition unit 22 generates an update question (information related to the second narrowing down information) on the basis of the second narrowing down information generated by the second generation unit 21, and transmits (outputs) the update question to the user terminal 50. The second user answer acquisition unit 22 generates the update question on the basis of the second narrowing down information and the truth table TB2 (refer to FIG. 4) stored in the answer DB 24. For example, it is assumed that the second narrowing down information is "mail, Android", and as shown in FIG. 4, in the truth table TB2, there are three answers ("When you forgot password of mail . . . ", "to attach image to mail . . . ", and "to create mail from phonebook . . . ") associated with the words "mail" and "Android". In the truth table TB2, "password" is further associated with the answer "When you forgot password of mail . . . ", "image" is further associated with the answer "to attach image to mail . . . ", and "phone book" is further associated with the answer "to create mail from phonebook . . . ". In this case, the second user answer acquisition unit 22 generates the update question so that it is possible to generate one answer by the updated second narrowing down information. That is, the first user answer acquisition unit 12 generates the update question (for example, "Is it question related to password?") for clarifying whether the question is a question related to the password, a question related to the image, or a question related to the phonebook.

The second user answer acquisition unit 22 receives, from the user terminal 50, a second user answer that is the answer of the user to the above-described update question. The second generation unit 21 described above updates the second narrowing down information on the basis of the second user answer. That is, for example, in a case in which the second narrowing down information before the update is "mail, Android" when the answer to the update question "Is it question related to password?" is "Yes", the second generation unit 21 updates the second narrowing down information to "mail, Android, password".

The answer generation unit 23 generates and outputs the answer to the question from the user on the basis of the second narrowing down information. The answer generation unit 23 specifies one answer corresponding to the second narrowing down information by referring to the truth table TB2 (refer to FIG. 4) of the answer DB 24. In the example shown in FIG. 4, for example, in a case in which it is assumed that the second narrowing down information is "mail, Android, password", the specification unit 13 refers to the truth table TB2 and specifies (generates) an answer "When you forgot password of mail . . . " with which the "mail" "Android", and "password" are associated as the answer to the user. The answer generation unit 23 transmits the generated answer to the user terminal 50.

Next, a process of the interaction but system 1 will be described with reference to FIGS. 5 to 7. Note that, FIGS. 5 to 7 also show a process of the user terminal 50 that is a main subject of the question, in addition to the process of the first bot device 10 and the second bot device 20 configuring the interaction bot system 1.

Figure 5:
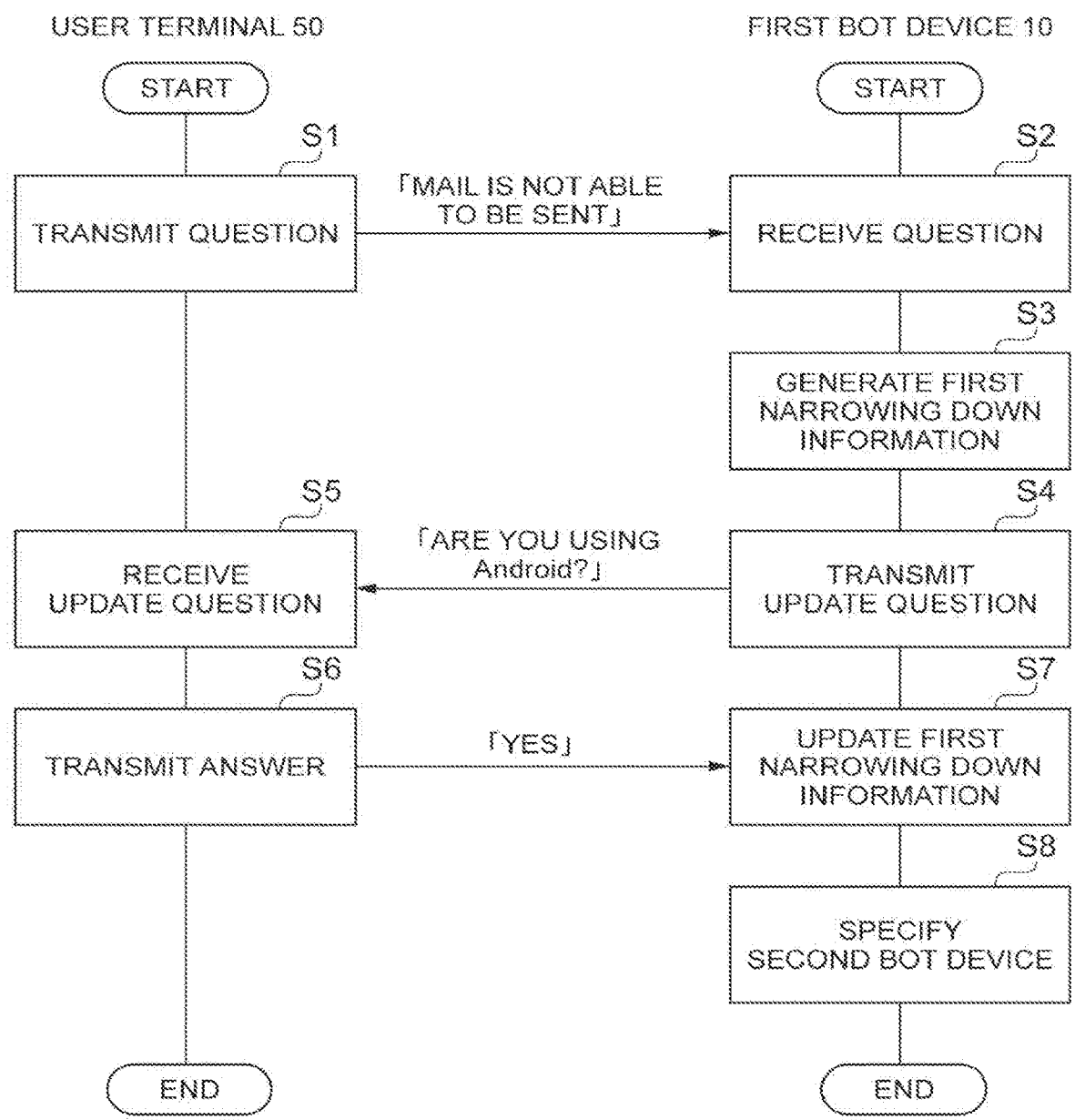
FIG. 5 is a sequence diagram showing a process of specifying a second bot device.

FIG. 5 is a sequence diagram showing a second bot device specification process. As shown in FIG. 5, in the second bot device specification process, first, the user terminal 50 transmits the question to the first bot device 10 (step S1). In the example shown in FIG. 5, the user terminal 50 has transmitted the question "mail is not able to be sent". In addition, the first bot device 10 receives the question (step S2), and the first generation unit 11 generates the first narrowing down information on the basis of the question (step S3). In the example shown in FIG. 5, for example, the word "mail" is set as the first narrowing down information according to the question "mail is not able to be sent" from the user terminal 50.

Next, the first user answer acquisition unit 12 generates the update question on the basis of the first narrowing down information, and transmits the update question to the user terminal 50. The first user answer acquisition unit 12 refers to the truth table TB1 (refer to FIG. 3), and for example, in the example shown in FIG. 3, the first user answer acquisition unit 12 generates the update question "Are you using Android?" so that one second bot device 20 is able to specified among the FAQ bot devices 20A to 20C, and transmits the update question to the user terminal 50.

The user terminal 50 receives the update question transmitted from the first bot device 10 (step S5), and transmits the answer to the update question to the first bot device 10 (step S6). In the example shown in FIG. 5, the answer "Yes" is transmitted to the update question "Are you using Android?".

Subsequently, the first user answer acquisition unit 12 receives the first user answer that is the answer of the user to the update question, from the user terminal 50, and the first generation unit 11 updates the first narrowing down information on the basis of the first user answer. For example, in a case in which the first narrowing down information before the update is "mail", when the answer to the update question "Are you using Android?" is "Yes", the first generation unit 11 updates the first narrowing down information to "mail, Android".

Next, the specification unit 13 specifies the second bot device 20 corresponding to the question from the user on the basis of the first narrowing down information. For example, in a case in which it is assumed that the first narrowing down information is "mail, Android", the specification unit 13 refers to the truth table TB1 (refer to FIG. 3) and specifies the FAQ bot device 20A with which "mail" and "Android" are associated as the second bot device 20 corresponding to the question from the user. The above is the second bot device specification process.

Figure 6:
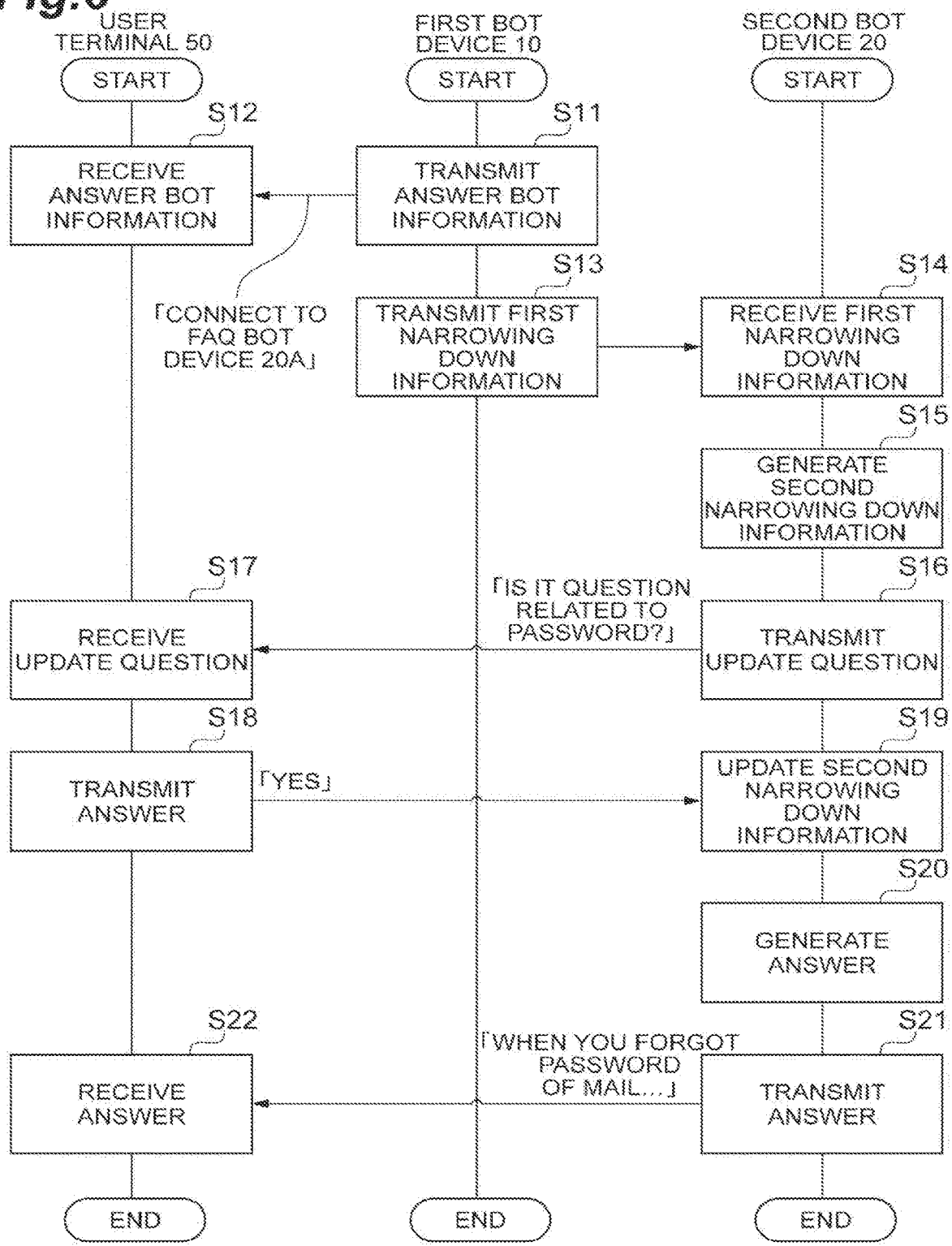
FIG. 6 is a sequence diagram showing an answer process.

FIG. 6 is a sequence diagram showing an answer process. The answer process is performed following the second bot device specification process shown in FIG. 5. As shown in FIG. 6, in the answer process, first, the specification unit 13 of the first bot device 10 transmits, to the user terminal 50, answer bot information that is information for notifying the user of the specified second bot device 20. (Step S11). The answer bot information includes, for example, a message to be displayed on the user terminal 50, such as "Connect to the FAQ bot device 20A". The user terminal 50 receives the answer bot information (step S12).

In addition, the specification unit 13 of the first bot device 10 transmits the first narrowing down information used for specifying the second bot device 20 to the specified second bot device 20 (step S13). The second generation unit 21 of the second bot device 20 receives the first narrowing down information transmitted from the first bot device 10 (step S14), and generates the second narrowing down information on the basis of the first narrowing down information shared by the specification unit 13 of the first bot device 10 (step S15). For example, in a case in which it is assumed that the first narrowing down information is "mail, Android", the second narrowing down information takes over the "mail, Android" as the second narrowing down information.

Next, the second user answer acquisition unit 22 generates the update question on the basis of the second narrowing down information generated by the second generation unit 21 and transmits the update question to the user terminal 50 (step S16). The second user answer acquisition unit 22 refers to the truth table TB2 (refer to FIG. 4), and for example, in the example shown in FIG. 4, the second user answer acquisition unit 22 generates the update question "Is it question related to password?" so that it is possible to specify one answer among three answer candidates "When you forgot password of mail . . . ", "to attach image to mail . . . ", and "to create mail from phonebook . . . ", and transmits the update question to the user terminal 50.

The user terminal 50 receives the update question transmitted from the second bot device 20 (step S17), and transmits the answer to the update question to the second bot device 20 (step S18). In the example shown in FIG. 6, the answer "Yes" is transmitted to the update question "Is it question related to password?".

Next, the second user answer acquisition unit 22 receives the second user answer that is the answer of the user to the update question, from the user terminal 50, and the second generation unit 21 updates the second narrowing down information on the basis of the second user answer (step S19). For example, in a case in which the second narrowing down information before the update is "mail, Android", when the answer to the update question "Is it question related to password?" is "Yes", the second generation unit 21 updates the second narrowing down information to "mail, Android, password".

Next, the answer generation unit 23 generates the answer to the question from the user on the basis of the second narrowing down information (step S20). For example, in a case in which it is assumed that the second narrowing down information is "mail, Android, password", the answer generation unit 23 refers to the truth table TB2 (refer to FIG. 4) and specifies (generates) the answer "When you forgot password of mail . . . " with which the "mail" "Android", and "password" are associated as the answer to the user. The answer generation unit 23 transmits the generated answer to the user terminal 50 (step S21), and the user terminal 50 receives the answer (step S22). The above is the answer process.

Here, in the second bot device 20 specified by the first bot device 10, a case in which an appropriate answer is not able to be specified from the second narrowing down information generated according to the question of the user may be considered. In such a case, a new second bot device 20 is specified in the first bot device 10 on the basis of the answer impossibility information transmitted from the second bot device 20. In the following, with reference to FIG. 7, a process of specifying a new second bot device 20 when the answer is not possible will be described.

Figure 7:
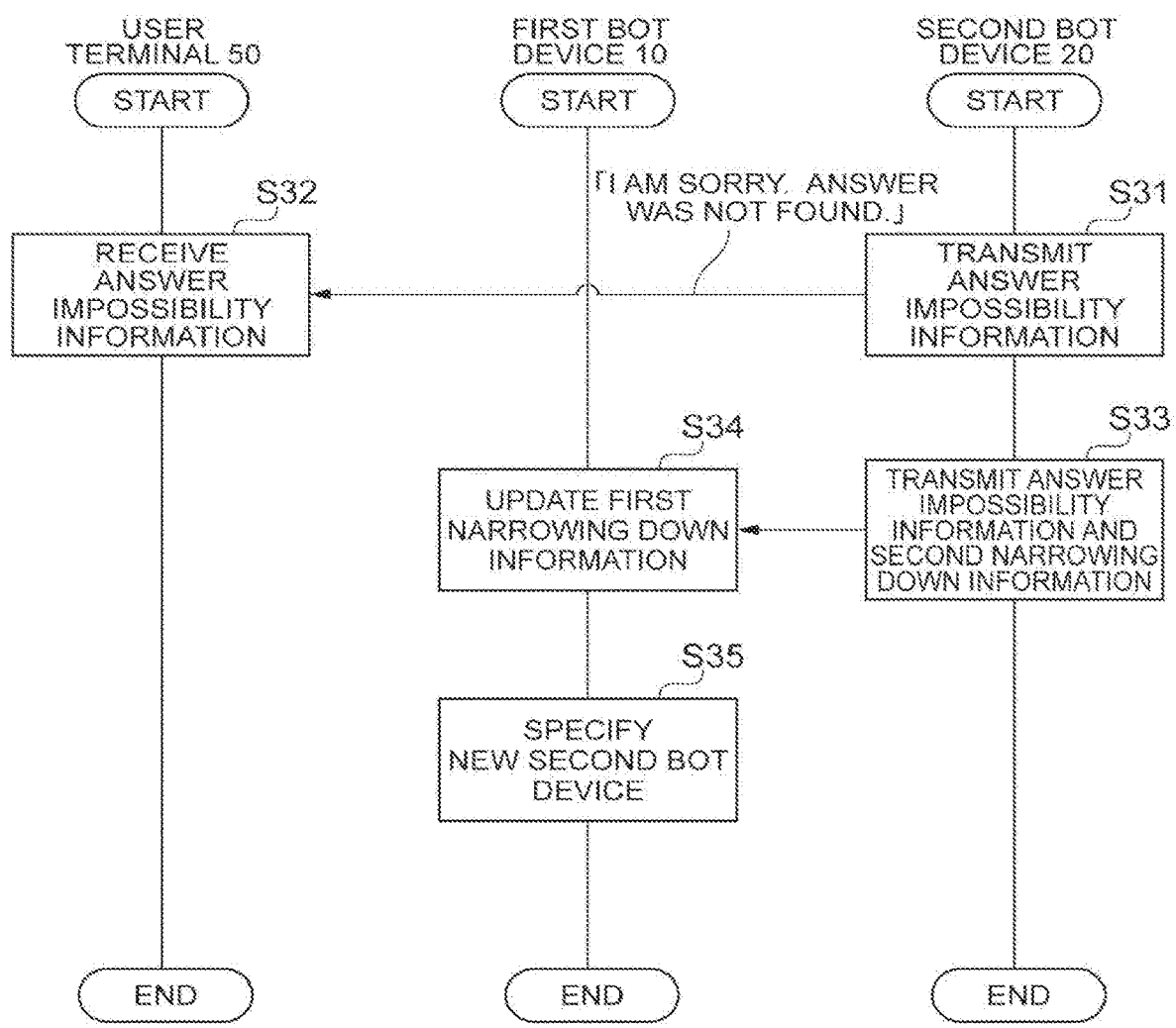
FIG. 7 is a sequence diagram showing a process of specifying a new second bot device when an answer is not possible.

FIG. 7 is a sequence diagram showing a process of specifying a new second bot device 20 when the answer is not possible. As shown in FIG. 7, the answer generation unit 23 of the second bot device 20 that is not able to specify the answer to the question transmits the answer impossibility information indicating that the answer to the question from the user could not be generated to the user terminal 50 (step S31). For example, the answer impossibility information includes a message to be displayed on the user terminal 50, such as "I am sorry. Answer was not found". The user terminal 50 receives the answer impossibility information transmitted from the second bot device 20 (step S32).

In addition, the answer generation unit 23 of the second bot device 20 that is not able to specify the answer to the question transmits the second narrowing down information used when generating the answer to the question from the user in addition to the answer impossibility information to the first bot device 10 (step S33). In addition, the first generation unit 11 of the first bot device 10 updates the generated first narrowing down information on the basis of the answer impossibility information and the second narrowing down information transmitted from the answer generation unit 23 (step S34).

That is, for example, in a case in which the generated first narrowing down information is "mail, Android", when the second narrowing down information "mail, Android, wireless LAN" is transmitted from the answer generation unit 23, the first generation unit 11 updates the first narrowing down information to "mail, Android, wireless LAN" on the basis of the second narrowing down information.

In addition, the specification unit 13 of the first bot device 10 specifies the new second bot device 20 on the basis of the updated first narrowing down information (step S35). That is, on the basis of the answer impossibility information and the second narrowing down information output from the answer generation unit 23 (specifically, on the basis of the first narrowing down information updated by the first generation unit 11 on the basis of such information), the specification unit 13 specifies the second bot device 20 other than the second bot device 20 that has output the answer impossibility information. The above is the process of specifying the new second bot device 20 when the answer is not possible.

Next, operation effect of the interaction bot system 1 according to the present embodiment will be described.

The interaction bot system 1 according to the present embodiment is an interaction answer system that interacts with the user and provides the answer to the question from the user. The interaction bot system includes the first bot device 10 and at least two or more second bot devices 20. The first bot device 10 includes the first generation unit 11 configured to generate the first narrowing down information for specifying the second bot device 20 on the basis of the question from the user, and the specification unit 13 configured to specify the second bot device 20 corresponding to the question from the user on the basis of the first narrowing down information. The second bot device 20 includes the second generation unit 21 configured to generate the second narrowing down information for specifying the answer to the question on the basis of the question from the user, and the answer generation unit 23 configured to generate and output the answer to the question from the user on the basis of the second narrowing down information.

In such an interaction answer system 1, the first bot device 10 specifies the second bot device 20 corresponding to the question from the user in accordance with the first narrowing down information based on the question from the user, and the second bot device 20 generates and outputs the answer to the question from the user according to the second narrowing down information based on the question from the user. That is, the interaction bot system 1 has a multi-stage configuration in which a configuration (the first bot device 10) that specifies a configuration for answering the question from the user (distributes the questions) and a configuration (the second bot device 20) that answers the question from the user are provided separately. Since the questions from the user are various, in a case in which answers to all the questions are generated in one configuration, it is necessary to prepare a large amount of data for matching the questions and perform complicated calculations. Therefore, there is a problem that the calculation cost of the system increases and the processing load on the system increases. In this respect, it is possible to distribute the processing load and reduce concentration of processes on a specific device, by separately providing the configuration that distributes the questions to an appropriate answer subject according to the question from the user from the configuration that generates the answer, such as the interaction bot system 1. In addition, by adopting the multi-stage configuration, at the time of maintenance of the system, it is possible to perform maintenance on only a specific device while avoiding the influence on a device that is not a target of the maintenance and it is possible to reduce maintenance cost.

The first generation unit 11 generates the first narrowing down information on the basis of the word obtained from the question from the user, and the second generation unit 12 generates the second narrowing down information on the basis of the word obtained from the question from the user. Therefore, it is possible to set narrowing down information as a list of words and it is possible to easily perform the specification of the second bot device 20 by the specification unit 13 and generation of the answer by the answer generation unit 23 in a word unit.

The specification unit 13 shares the first narrowing down information generated by the first generation unit 11 with the specified second bot device 20, and the second generation unit 21 generates the second narrowing down information on the basis of the first narrowing down information shared by the specification unit 13. Therefore, it is possible to generate the second narrowing down information easily and accurately in the second bot device 20 by using the first narrowing down information generated in the first bot device 10.

The first generation unit 11 updates the first narrowing down information on the basis of the first update information for updating the generated first narrowing down information, and the second generation unit 21 updates the second narrowing down information on the basis of the second update information for updating the generated second narrowing down information. As described above, by appropriately updating the generated narrowing down information on the basis of predetermined information, it is possible to improve the accuracy of the specification of the second bot device 20 and the generation accuracy of the answer. That is, for example, in a case in which the second bot device 20 is not able to be specified by the initially generated first narrowing down information, it is possible to appropriately specify the second bot device 20 by the updated first narrowing down information, or even in a case in which the answer is not able to be generated by the initially generated second narrowing down information, it is possible to appropriately generate the answer by the updated second narrowing down information.

The first bot device 10 further includes the first user answer acquisition unit 12 configured to output information related to the first narrowing down information and obtain the first user answer that is the answer of the user for the information related to the first narrowing down information. The second bot device 20 further includes the second user answer acquisition unit 22 configured to output information related to the second narrowing down information and obtains the second user answer that is the answer of the user for the information related to the second narrowing down information. The first generation unit 11 updates the first narrowing down information using the first user answer as the first update information. The second generation unit 21 updates the second narrowing down information using the second user answer as the second update information. Therefore, it is possible to update the first narrowing down information and the second narrowing down information from the answer from the user in relation to the narrowing down information, and it is possible to generate an answer more reflecting an intention of the user.

In a case in which the answer generation unit 23 is not able to generate the answer to the question from the user, the answer generation unit 23 outputs the answer impossibility information indicating that the answer is not able to be generated, and the specification unit 13 specifies the second bot device 20 other than the second bot device 20 which has output the answer impossibility information, on the basis of the answer impossibility information. Therefore, in a case in which the initially specified second bot device 20 is not able to answer the question from the user, it is possible to specify the other second bot device 20 (the second bot device 20 that is able to answer) other than the second bot device 20 which could not answer. That is, it is possible to easily specify an appropriate second bot device 20.

The answer generation unit 23 outputs the second narrowing down information used when generating the answer to the question from the user, in addition to the answer impossibility information, and the specification unit 13 specifies the second bot device 20 other than the second bot device 20 that has output the answer impossibility information on the basis of the answer impossibility information and the second narrowing down information output from the answer generation unit 23. Therefore, it is possible to use the second narrowing down information generated by the initially specified second bot device 20 (the second bot device 20 which could not answer the question) as information for specifying a new second bot device 20, and it is easy to specify a more appropriate second bot device 20.

Figure 8:
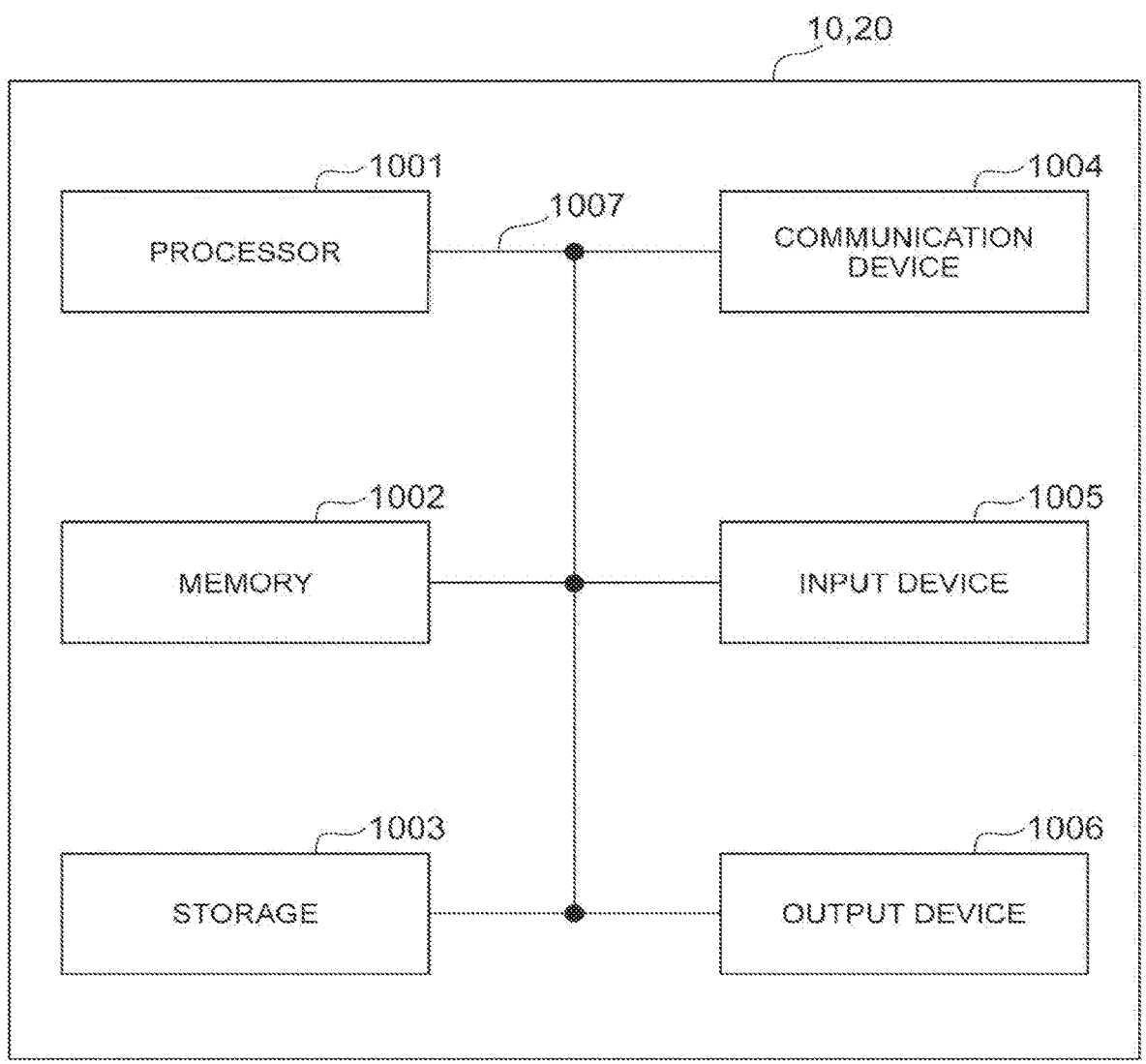
FIG. 8 is a diagram showing a hardware configuration of each configuration included in the interaction bot system.

Finally, a hardware configuration of the first bot device 10 and the second bot device 20 included in the interaction bot system 1 will be described with reference to FIG. 8. The first bot device 10 and the second bot device 20 described above are physically configured as a computer device including a processor 1001, a memory 1002, a storage 1003, a communication device 1004, an input device 1005, an output device 1006, a bus 1007, and the like.

Note that, in the following description, the term "device" is able to be read as a circuit, a device, a unit, or the like. The hardware configuration of the first bot device 10 and the second bot device 20 may be configured to include one or more of the devices shown in the figure, or may be configured without including some devices.

Each function in the first bot device 10 and the second bot device 20 is realized by reading predetermined software (program) on hardware such as the processor 1001 and the memory 1002, performing an operation by the processor 1001, and controlling communication by the communication device 1004, or reading and/or writing of data in the memory 1002 and the storage 1003.

The processor 1001 operates, for example, an operating system to control the entire computer. The processor 1001 is configured by a central processing unit (CPU) including an interface with a peripheral device, a control device, an operation device, a register, and the like. For example, a control function of the first generation unit 11 or the like of the first bot device 10 and a control function of the second generation unit 21 or the like of the second bot device 20 may be realized by the processor 1001.

In addition, the processor 1001 reads a program (program code), a software module or data from the storage 1003 and/or the communication device 1004 to the memory 1002, and executes various processes according to these. As a program, a program that causes a computer to execute at least a part of the operations described in the above-described embodiments is used. For example, the control function of the first generation unit 11 or the like of the first bot device 10 and the control function of the second generation unit 21 or the like of the second bot device 20 may be realized by a control program stored in the memory 1002 and operated by the processor 1001, or other functional blocks may also be realized similarly. The various processes described above have been described to be performed by one processor 1001, but may be performed simultaneously or sequentially by two or more processors 1001. The processor 1001 may be implemented by one or more chips. Note that, the program may be transmitted from a network through a telecommunication line.

The memory 1002 is a computer-readable recording medium, and, for example, may be configured by at least one of a read only memory (ROM), an erasable programmable ROM (EPROM), an electrically erasable programmable ROM (EEPROM), and a random access memory (RAM). The memory 1002 may be referred to as a register, a cache, a main memory (main storage device) or the like. The memory 1002 is able to store a program (program code), a software module, and the like that are able to be executed to implement the wireless communication method according to an embodiment of the present invention.

The storage 1003 is a computer-readable recording medium, and for example, may be configured by at least one of an optical disk such as a compact disc ROM (CD-ROM), a hard disk drive, a flexible disk, a magneto-optical disk (for example, a compact disk, a digital versatile disk, and Blu-ray (registered trademark) disk), a smart card, a flash memory (for example, a card, a stick, and a key drive), a floppy (registered trademark) disk, a magnetic strip, and the like. The storage 1003 may be referred to as an auxiliary storage device. The storage medium described above may be, for example, a database including the memory 1002 and/or the storage 1003, a server, or any other suitable medium.

The communication device 1004 is hardware (transmission and reception device) for performing communication between computers through a wired and/or wireless network, and is also referred to as, for example, a network device, a network controller, a network card, a communication module, or the like.

The input device 1005 is an input device (for example, a keyboard, a mouse, a microphone, a switch, a button, a sensor, and the like) that receives an input from the outside. The output device 1006 is an output device (for example, a display, a speaker, an LED lamp, and the like) that implements output to the outside. Note that, the input device 1005 and the output device 1006 may be integrated (for example, a touch panel).

In addition, each device such as the processor 1001 or the memory 1002 is connected by a bus 1007 for communicating information. The bus 1007 may be configured as a single bus or may be configured as buses different among the devices.

In addition, the first bot device 10 and the second bot device 20 may include hardware such as a microprocessor, a digital signal processor (DSP), an application specific integrated circuit (ASIC), a programmable logic device (PLD), and a field programmable gate array (FPGA), and a part or all of each functional block may be realized by the hardware. For example, the processor 1001 may be implemented by at least one of such hardware.

The present embodiment has been described above in detail, but it will be obvious to those skilled in the art that the present embodiment is not limited to the embodiment described in the present specification. The present embodiment can be implemented as changes and modifications without departing from the spirit and scope of the present invention as defined by the claims. Therefore, the description of the present specification is for the purpose of illustration and does not have any restrictive meaning to the present embodiment.

Each aspect/embodiment described in the present specification may be applicable to long term evolution (LTE), LTE-advanced (LTE-A), SUPER 3G, IMT-Advanced, 4G, 5G, future radio access (FRA), W-CDMA (registered trademark), GSM (registered trademark), CDMA2000, ultra mobile broad-band (UMB), IEEE 802.11 (Wi-Fi), IEEE 802.16 (WiMAX), IEEE 802.20, ultra-wide band (UWB), Bluetooth (registered trademark), and systems using any other appropriate systems and/or next generation systems expanded on the basis of the systems.

The process procedures, the sequences, the flowcharts, and the like of each aspect/embodiment described in the present specification may be reversed in order unless there is a contradiction. For example, the method described in the present specification presents elements of various steps in an exemplary order and is not limited to a presented specific order.

The input and output information and the like may be stored in a specific place (for example, a memory) or may be managed by a management table. The input and output information and the like may be overwritten, updated, or additionally written. The output information and the like may be deleted. The input information and the like may be transmitted to another device.

The determination may be performed in accordance with a value (0 or 1) indicated by one bit, may be performed in accordance with a Boolean value (true or false), or may be performed by a comparison of numerical values (for example, a comparison with a predetermined value).

Each aspect/embodiment described in the present specification may be used alone, may be used in combination, or may be switched in association with execution. In addition, a notification of predetermined information (for example, a notification indicating "being X") is not limited to one which is performed explicitly and may be performed implicitly (for example, a notification of the predetermined information is not given).

Software can be interpreted widely to mean a command, a command set, a code, a code segment, a program code, a program, a subprogram, a software module, an application, a software application, a software package, a routine, a subroutine, an object, an executable file, an execution thread, a procedure, a function, and the like regardless of whether software is called software, firmware, middleware, a microcode, a hardware description language, or any other name.

In addition, software, commands, and the like may be transmitted and received via a transmission medium. For example, in a case where software is transmitted from a web site, a server, or any other remote source using a wired technology such as a coaxial cable, a fiber optic cable, a twisted pair, or a digital subscriber line (DSL) and/or a wireless technology such as infrared rays, a radio wave, or a microwave, the wired technology and/or the wireless technology are included in a definition of a transmission medium.

The information, signals, and the like described in the present specification may be indicated using any one of a variety of different techniques. For example, the data, instructions, commands, information, signals, bits, symbols, chips, and the like which are mentioned throughout the above description may be indicated by voltages, currents, electromagnetic waves, magnetic fields, magnetic particles, optical fields or photons, or an arbitrary combination thereof.

Note that, the terms described in the present specification and/or terms necessary for understanding the present specification may be replaced with terms having the same or similar meanings.

In addition, the information, parameters, and the like described in the present specification may be indicated by absolute values, may be indicated by relative values from predetermined values, or may be indicated by corresponding other information.

The user terminal is referred to as a mobile station communication terminal, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or other appropriate terms by those skilled in the art.

The terms "determining" and "deciding (determining)" used in the present specification may include a wide variety of actions. For example, "determining" and "deciding" may include, for example, events in which events such as calculating, computing, processing, deriving, investigating, looking up (for example, looking up in a table, a database, or another data structure), or ascertaining are regarded as "determining" or "deciding." In addition, "determining" and "deciding" may include, for example, events in which events such as receiving (for example, receiving information), transmitting (for example, transmitting information), input, output, or accessing (for example, accessing data in a memory) are regarded as "determining" or "deciding." In addition, "determining" and "deciding" may include, for example, events in which events such as resolving, selecting, choosing, establishing, or comparing are regarded as "determining" or "deciding." In other words, "determining" and "deciding" may include events in which a certain operation is regarded as "determining" or "deciding."

The phrase "on the basis of" used in the present specification is not limited to "only on the basis of" unless otherwise stated. In other words, a phrase "on the basis of" means both "only on the basis of" and "at least on the basis of".

Any reference to an element using a designation such as "first," "second," or the like used in the present specification does not generally restrict quantities or an order of those elements. Such designations can be used in the present specification as a convenient method of distinguishing between two or more elements. Thus, reference to the first and second elements does not mean that only two elements can be adopted there, or first element should precede the second element in a certain form.

"Include", "including,", and variations thereof are intended to be comprehensive, similarly to a term "comprising" as long as the terms are used in this specification or claims set forth below. In addition, the term "or" used in the present specification or claims set forth below is intended not to be an exclusive disjunction.

In the present specification, a plurality of devices are provided except for a case in which clearly only one device is present contextually or technically.

In the whole present disclosure, unless the context clearly indicates singular, the singular is intended to include the plural.

REFERENCE SIGNS LIST

1 Interaction bot system (interaction answer system)
10 First bot device (interaction device, first interaction unit)
11 First generation unit
12 User answer acquisition unit
13 Specification unit
20 Second bot device (answer unit, second interaction unit)
21 Second generation unit
22 User answer acquisition unit
23 Answer generation unit

The invention claimed is:

1. An interaction answer system that interacts with a user and provides an answer to a question from the user, the interaction answer system comprising:
a first bot device and at least two or more second bot devices:
wherein the first bot device includes processing circuitry configured to implement:
a first generation unit configured to generate first narrowing down information for specifying at least one of the second bot devices on the basis of the question from the user; and
a specification unit configured to specify the second bot device corresponding to the question from the user on the basis of the first narrowing down information, and
each of the second bot devices includes processing circuitry configured to implement:

a second generation unit configured to generate second narrowing down information for specifying the answer to the question on the basis of the question from the user; and an answer generation unit configured to generate and output the answer to the question from the user on the basis of the second narrowing down information, wherein the specification unit shares the first narrowing down information generated by the first generation unit with the specified second bot device, and the second generation unit generates the second narrowing down information on the basis of the first narrowing down information shared by the specification unit.

2. An interaction answer system that interacts with a user and provides an answer to a question from the user, the interaction answer system comprising:

a first bot device and at least two or more second bot devices;

wherein the first bot device includes processing circuitry configured to implement:

a first generation unit configured to generate first narrowing down information for specifying at least one of the second bot devices on the basis of the question from the user; and a specification unit configured to specify the second bot device corresponding to the question from the user on the basis of the first narrowing down information, and each of the second bot devices includes processing circuitry configured to implement:

a second generation unit configured to generate second narrowing down information for specifying the answer to the question on the basis of the question from the user; and an answer generation unit configured to generate and output the answer to the question from the user on the basis of the second narrowing down information, wherein, in a case in which the answer generation unit is not able to generate the answer to the question from the user, the answer generation unit outputs answer impossibility information indicating that the answer is not able to be generated, and the specification unit specifies at least one of the second bot devices other than the second bot device which has output the answer impossibility information, on the basis of the answer impossibility information.

3. The interaction answer system of claim 2, wherein the answer generation unit outputs the second narrowing down information used when generating the answer to the question from the user, in addition to the answer impossibility information, and the specification unit specifies the at least one of the second bot devices other than the second bot device that has output the answer impossibility information on the basis of the answer impossibility information and the second narrowing down information output from the answer generation unit.

4. A method implemented by an interaction answer system that interacts with a user and provides an answer to a question from the user, the interaction answer system including a first bot device and at least two or more second bot devices, the method comprising:

performing by processing circuitry of the first bot device:

generating first narrowing down information for specifying at least one of the second bot devices on the basis of the question from the user; and specifying the second bot device corresponding to the question from the user on the basis of the first narrowing down information, and performing by processing circuitry of the specified second bot device:

generating second narrowing down information for specifying the answer to the question on the basis of the question from the user; and generating and outputting the answer to the question from the user on the basis of the second narrowing down information, wherein the first bot device shares the generated first narrowing down information with the specified second bot device, and the specified second bot device generates the second narrowing down information on the basis of the first narrowing down information shared by the first bot device.

* * * * *